(12) United States Patent
Neuhaeuser

(10) Patent No.: US 11,627,456 B2
(45) Date of Patent: Apr. 11, 2023

(54) COMMUNICATION IN A MOBILE RADIO NETWORK

(71) Applicant: BAYERISCHE MOTOREN WERKE AKTIENGESELLSCHAFT, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 10 days.

(21) Appl. No.: 17/053,221

(22) PCT Filed: May 8, 2019

(86) PCT No.: PCT/EP2019/000139
§ 371 (c)(1),
(2) Date: Nov. 5, 2020

(87) PCT Pub. No.: WO2019/214842
PCT Pub. Date: Nov. 14, 2019

(65) Prior Publication Data
US 2021/0314763 A1  Oct. 7, 2021

(30) Foreign Application Priority Data

May 8, 2018 (DE) .......................... 102018207161.6

(51) Int. Cl.
| | |
|---|---|
| *H04W 12/06* | (2021.01) |
| *H04W 8/20* | (2009.01) |
| *H04W 8/26* | (2009.01) |
| *H04W 60/00* | (2009.01) |
| *H04W 4/40* | (2018.01) |

(52) U.S. Cl.
CPC ........... *H04W 8/205* (2013.01); *H04W 8/265* (2013.01); *H04W 12/06* (2013.01); *H04W 60/00* (2013.01); *H04W 4/40* (2018.02)

(58) Field of Classification Search
CPC ................................ H04W 8/20; H04W 8/22
See application file for complete search history.

(56) References Cited

U.S. PATENT DOCUMENTS

| | | | |
|---|---|---|---|
| 2014/0045459 A1 | 2/2014 | Hjelm et al. | |
| 2015/0237497 A1* | 8/2015 | Chen | H04W 8/183 455/558 |
| 2017/0315797 A1* | 11/2017 | Vangelov | H04L 67/12 |
| 2018/0063698 A1 | 3/2018 | Sonntag | |

(Continued)

FOREIGN PATENT DOCUMENTS

| | | | |
|---|---|---|---|
| DE | 202017006593 U1 | 3/2018 | |
| EP | 3276998 A1 | 1/2018 | |

(Continued)

*Primary Examiner* — Michael T Vu
(74) *Attorney, Agent, or Firm* — 2SPL Patent Attorneys PartG mbB; Kieran O'Leary

(57) ABSTRACT

A method comprising the steps of authenticating a user to a mobile device; downloading an activation code from a first external service; downloading a telecommunications profile associated with the user for a mobile radio network from a second external service to the mobile device; and providing a telecommunications connection between the mobile device and the mobile radio network based on the telecommunications profile.

10 Claims, 3 Drawing Sheets

(56) References Cited

U.S. PATENT DOCUMENTS

2018/0108194 A1* 4/2018 Link, II .................. H04L 67/12
2019/0174299 A1* 6/2019 Ullah .................... H04W 8/205

FOREIGN PATENT DOCUMENTS

| WO | 2016145815 A1 | 9/2016 |
| WO | 2017039320 A1 | 3/2017 |
| WO | 2018036624 A1 | 3/2018 |

* cited by examiner

COMMUNICATION IN A MOBILE RADIO NETWORK

CROSS-REFERENCE TO RELATED APPLICATIONS

This application is a 35 U.S.C. § 371(c) national stage entry of PCT/EP2019/000139, filed on May 8, 2019. That application claimed priority to German Application 10 2018 207 161.6, filed on May 8, 2018. The contents of the earlier filed applications are incorporated by reference herein in their entirety.

FIELD

The present invention relates to a method, a device and a system for supporting a communication between a motor vehicle and a mobile radio network. In particular, the invention relates to communication in dependence on a user on board of the motor vehicle.

BACKGROUND

A user may use a mobile device, such as a mobile telephone, to use a communication connection in a mobile radio network. Within a motor vehicle there is often a strong attenuation of electromagnetic waves which are used for the connection. In order to be able to work nevertheless with low field strengths, the motor vehicle may include its own modem, which may provide a connection to the mobile radio network by means of an antenna mounted on the outside of the motor vehicle. The modem may be coupled to the mobile telephone, so that the communication between the modem and the mobile radio network may be based on a communication profile of the user stored in the mobile telephone. The modem uses the communication profile of the user on loan, so to speak. During communication, a connection between the mobile telephone and the modem is required, even if transmitted voice or information is not input or output by means of the mobile telephone.

However, for this technology the user always has to carry his mobile telephone with him and the mobile telephone has to be active during communication. If the user wants to use different vehicles, a coupling between mobile radio telephone and modem must be established each time.

SUMMARY

One of the objects underlying the invention is to improve support of the user when communicating via the mobile radio network. The invention solves this object by means of the subject matters of the independent claims. Subclaims represent preferred embodiments.

According to a first aspect of the invention a method comprises steps of authenticating a user to a mobile device; downloading an activation code from a first external service; downloading a telecommunications profile for a mobile radio network associated with the user from a first external service to the mobile device on the basis of the activation code; and providing a telecommunications connection between the mobile device and the mobile radio network based on the telecommunications profile.

The mobile device may include any device that is set up to communicate with the mobile radio network, such as a mobile telephone, laptop, smart phone, smart watch or Internet of Things (IoT) device.

The activation code is preferably downloaded from a service other than a mobile radio network operator. No subscriber identification in the mobile radio network (IMSI: International Mobile Subscriber Identity) is required; this may rather be included in the mobile radio profile provided. If several mobile radio profiles are assigned to the user by the mobile radio operator, the user may select one or a selection may be made automatically for him. If necessary, a mobile radio profile assigned to the user may also be dynamically downloaded from the mobile radio operator to the external service, for example in response to a request from the user and/or the mobile device to download the mobile radio profile. This may be necessary, for example, if the user is assigned more mobile radio profiles than may be downloaded by him according to a specification of the mobile radio operator.

This makes it easier for the user to use different mobile devices without having to establish a connection each time between a mobile telephone assigned to him, on which his telecommunications profile is stored, and the mobile device. An undesired coupling between the communication profile and a specific mobile device assigned to the user may be broken, thus improving safety of the user's privacy. It is not necessary for the user to carry the assigned mobile telephone with him and he does not have to worry about an energy supply of the assigned mobile telephone. Also, the establishment of a communication connection between the mobile telephone and the mobile device mentioned herein ("pairing"), which often involves the manual entry of a code, may be omitted. For the communication between the mobile device and the user, the mobile device may be equipped, for example, with a hands-free set. Automatic voice control may be provided to control the communication connection.

In particular, the activation code may be requested by the first service from the second service. The second service may provide the activation code to the first service, which may forward the activation code to the mobile device.

A request for the provision of the activation code may include a reference to an identification of the mobile device. The request may also include a reference to an identification of the person. In particular, the request may be made by the first service on the basis of information previously received from the mobile device.

Preferably, the mobile device is a vehicle, for example a passenger vehicle such as a bicycle or a skateboard, or a transportation vehicle. The vehicle is usually a land vehicle, but may also include a watercraft or an aircraft. Further preferred is a powered vehicle, i.e. a motor vehicle. The motor vehicle includes, preferably, a passenger motor vehicle or a passenger motorcycle, but may also include a truck or bus. As explained in more detail below, the vehicle or motor vehicle may be the subject of a rental agreement or may be used for other reasons by frequently changing persons.

The telecommunications profile may include an IMSI number International Mobile Subscriber Identity). The IMSI is usually unique throughout the network and may be used to identify the user and to establish connections between different mobile radio networks, for example GSM, UMTS or LTE. The IMSI is defined in the 3GPP standard (cf. specification 11.11, in particular Chapter 10.3), so that a well-known and proven technology may be used for the technology presented here. Compatibility with current mobile radio networks may be ensured.

The telecommunications profile may be loaded into a SIM and the telecommunications connection may be provided by means of the SIM (SIM: Subscriber Identity Module). The SIM is usually provided as a semiconductor, on an exchangeable chip card or soldered in place, on a mobile telephone or other mobile terminal device (ME: Mobile equipment, mobile terminal device). Certain variants of the SIM, in particular the eSIM, which is also configured for machine-to-machine communication, allow a telecommunications profile to be loaded. The architecture of a SIM and communication with same are internationally standardized by the 3GPP.

The user may be authorized for a use of the mobile device on the basis of the authentication. This is particularly true if the mobile device is a vehicle, preferably a motor vehicle. For example, the user may use one of several predetermined motor vehicles, for example within the framework of a car-sharing service, a company fleet or one or more family vehicles. Using the technology presented here, he may easily use different motor vehicles under the same identity and respectively exchange mobile data. The user's authentication may be used both for authorization for the motor vehicle and for selecting the telecommunications profile assigned to him. This principle may be transferred to any mobile device.

The mobile device may be made available to a predetermined group of users and each user may communicate under his identity after authentication with the mobile device.

Authentication may involve the scanning of a biometric feature of the user, such as a fingerprint or a retinal image. The language of the user may also be analyzed for his authentication. The profile may thus be protected against misuse. The authentication may also involve the entry of a code by the user. The code may be used additionally or exclusively for authentication.

In a further embodiment, the input of a user code is detected and the telecommunications profile is activated by means of the code. In particular, part of the code may correspond to a PIN (Personal Identification Number) intended to decrypt or activate certain information stored in the SIM. The PIN may be freely selected by the user. The authentication of the user may thus be further improved and used several times. In one embodiment, the user may be authorized to use the mobile device if access to the telecommunications profile using the entered code was successful.

Downloading the telecommunications profile is preferably done via a separate telecommunications connection. The mobile device may include a modem to communicate with the mobile radio network, wherein for specific purposes such as eCall or telemetry a provided SIM may be used. The telecommunications profile may be requested and/or downloaded via this connection. A data connection for the user may then be established via the same modem using the user's assigned telecommunications profile. Using different SIMs with one modem, even simultaneously, is known by the designations Multi-SIM or Dual-SIM. If two profiles are to be used simultaneously, a modem specially configured for this purpose ("dual active") may be provided. A dedicated modem may also be placed in the mobile device for the user's downloaded telecommunications profile.

According to a further aspect, a mobile device comprises a vehicle, in particular a motor vehicle; a scanning device for authenticating a user to the vehicle; a first communication device configured to wirelessly download an activation code from a first external service, and to download a telecommunications profile associated with the user from a second external service based on the activation code; and a second communication device configured to provide a telecommunications connection between the vehicle and a mobile radio network based on the telecommunications profile.

The mobile device may include a processing device for control. In particular, the processing device may here be configured to carry out at least part of a method described herein. For this purpose, the processing device may include a programmable microcomputer or microprocessor and the method may, in whole or in part, be in the form of a computer program product with program code means. The computer program product may also be stored on a computer-readable data carrier. Advantages or features of the method may be transferred to the device or vice versa.

According to a further aspect, a server component comprises a communication device; and a processing device configured to provide, in response to a request from a mobile device, an activation code comprising a reference to a resource from which a communication profile associated with the user may be downloaded. The communication profile may here be used to use a telecommunications connection between the mobile device and a mobile radio network. The processing device may be configured to carry out at least part of a method described herein. Advantages or features of the method may be transferred to the system or vice versa.

BRIEF DESCRIPTION OF THE FIGURES

The invention is now described in more detail with reference to the attached drawings in which.

DETAILED DESCRIPTION

Figure 1:
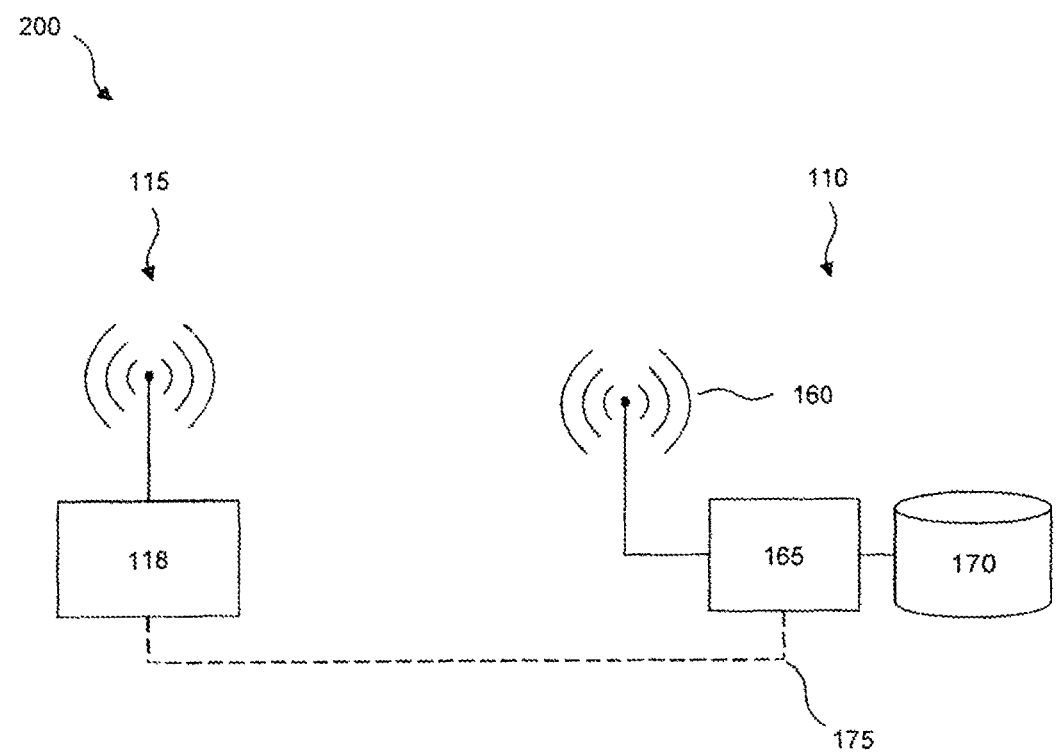
FIG. 1 illustrates a system.
Figure 1:
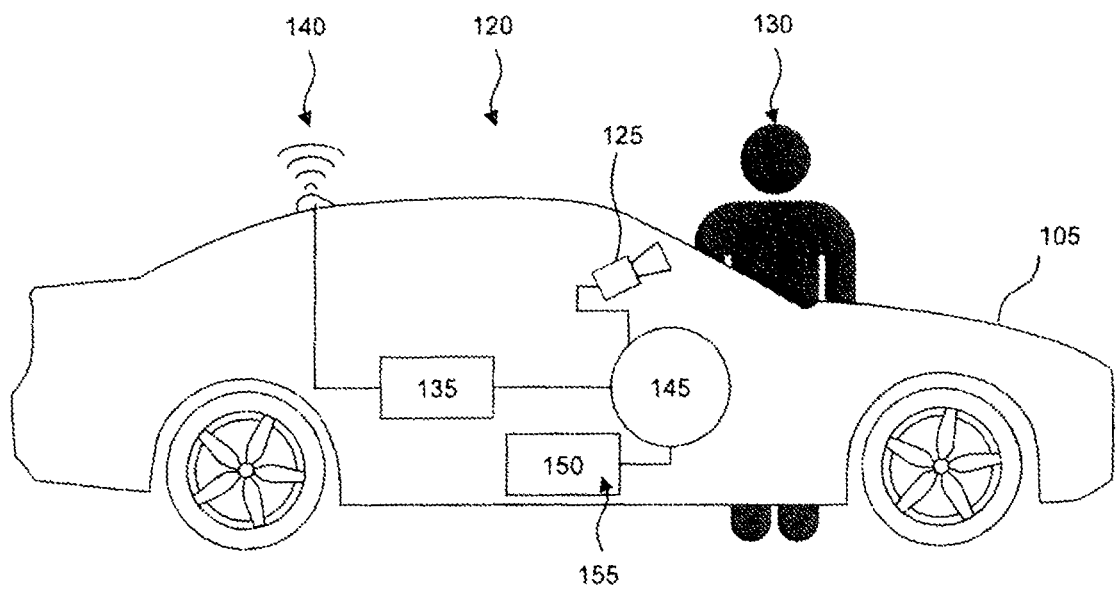

FIG. 1 shows a system 100 comprising a mobile device 105 and a server component 110. The mobile device 105 is exemplarily configured as a motor vehicle 105. The mobile device 105 may also be configured as a stand-alone device, for example as a mobile telephone, or integrated into a personal device such as a smartphone, laptop computer or tablet computer. The mobile device 105 may also be integrated into an article of daily use, for example a shoe or a ski. Furthermore, the mobile device 105 may be assigned to a predetermined facility, for example a hotel room. In the following, a motor vehicle 105 is assumed to be a mobile device 105 without loss of generality. The server component 110 is configured to manage information about a user in the form of a first service.

Furthermore, a mobile radio network 115 is represented by a transmitting and receiving station. The mobile radio network 115 usually comprises a plurality of such stations, which may communicate with each other in different ways. A connection to another wired or wireless network may also be provided. The mobile radio network 115 is controlled by a Mobile Network Operator (MNO).

A server component 118 is included in the mobile radio network 115 or may be operated by the MNO. The server component 118 is configured to provide a communication profile 155 of a predetermined user 130 to a mobile device 105 assigned to the user 130. The server component 118 may offer this functionality in the form of a service.

The motor vehicle 105 comprises a device 120 comprising a scanning device 125 for authentication of a user 130 and one or more communication devices 135, which may in particular be configured as modems. The communication devices 135 are usually connected to an antenna 140 which is preferably mounted to the outside of the vehicle 105, for wireless communication. A processing device 145 may be provided for control. In addition, a memory device 150 for storing one or more communication profiles 155 may be included by the device 120. The memory device 150 may be configured in particular as a SIM, more preferably as an eSIM.

The scanning device 125 may authenticate the user 130 in any way. For this purpose, the scanning device may accept an input of the user 130 and compare it with predetermined data. The user 130 may also be biometrically authenticated by having the scanning device 125 scan a biometric feature of the user 130 and compare it with predetermined data. The user 130 may also have some form of mechanical or electronic key, such as in the form of a chip card, magnetic card or token card, using which he may be authenticated.

The server component 110 includes a communication device 160, a processing device 165, and a data storage 170. The communication device 165 may be implemented wirelessly and may be configured to communicate with the motor vehicle 105. A communication with the mobile radio network 115 may be done using the same communication device 165 or by other means, for example, using a wired network 175. A communication between the server component 110 and the motor vehicle 105 may also take place via the mobile radio network 115.

The data storage 170 is configured to store communication profiles 155 for a plurality of users 130 in a form that allows assignment to the respective user 130. The server component 110 may be realized as a computer, a server or as a service in a cloud.

It is proposed to support a communication of the user 130 in the area of the motor vehicle 105 via the mobile radio network 115 on the basis of a communication profile 115 assigned to him by keeping the communication profile 115 on the server component 110 and loading it into the device 120 when required. Unlike other solutions, the communication profile 115 is no longer bound to a device of the user 130 that the user 130 must carry along, but may follow the user 130 by dynamically loading it into a device 120 and optionally activating it automatically, for example after the user 130 logs in.

Figure 2:
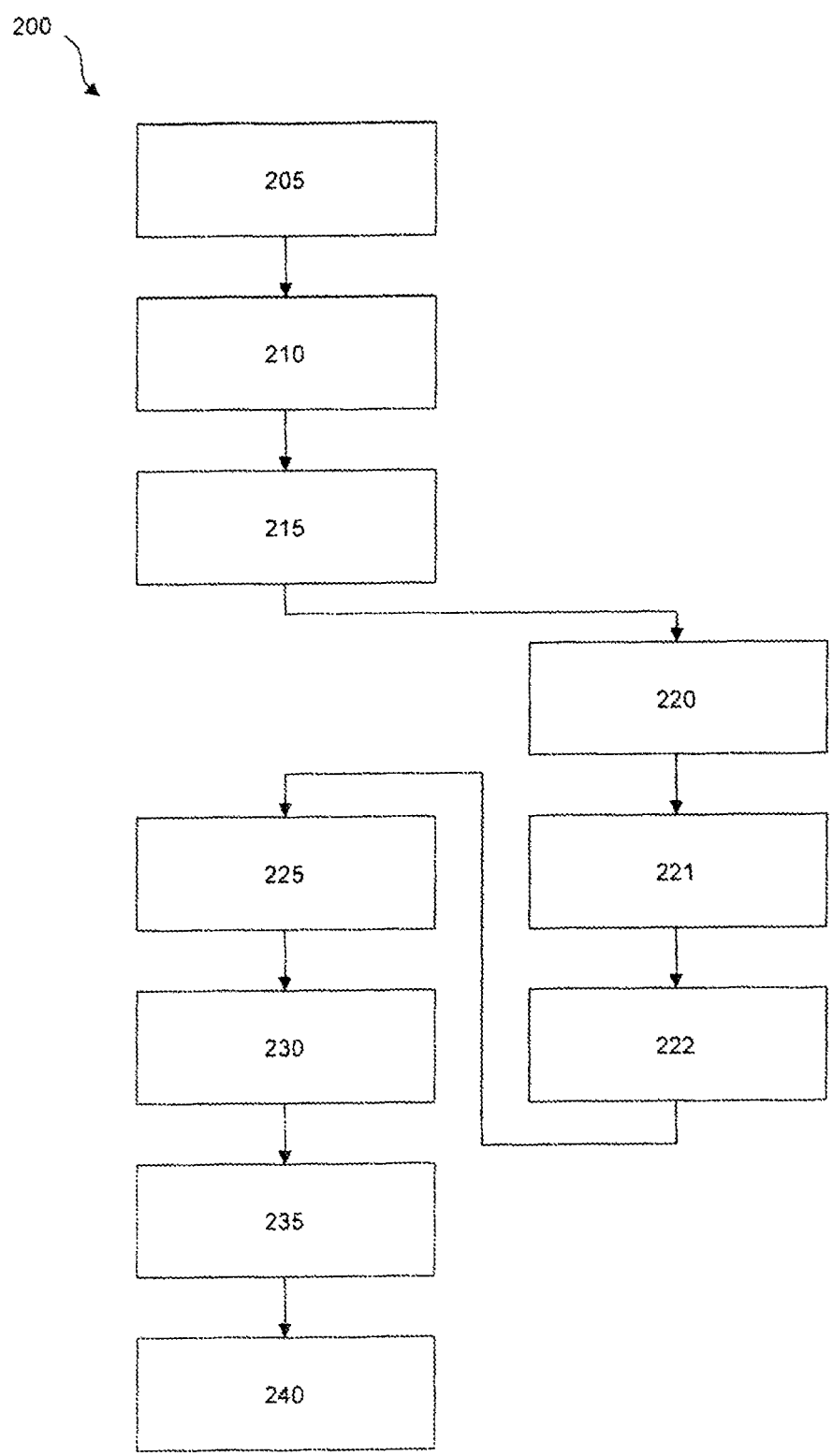
FIG. 2 illustrates a flow chart of a first method.

FIG. 2 shows a flowchart of a method 200, which may be executed especially in connection with the system 100 of FIG. 1. To continue the example given above, it is assumed purely by way of example that the mobile device 105 is configured as a motor vehicle 105 or integrated with a motor vehicle 105. Steps shown in the illustration on the left-hand side are preferably performed by the motor vehicle 105, and steps shown on the right are preferably performed by the server component 110.

In a step 205, the user 130 is scanned by the scanning device 125. Here, an input from the user 130, in particular a numeric or alphanumeric code, the presentation of an authentication object such as a chip card or an RFID tag, or a biometric feature of the user 130 may be detected.

The result of the scanning may be evaluated locally in one step 210. The primary goal of the evaluation is to determine which user 130 is standing at the device 120. It is also possible to determine what personal data about the user 130 is stored in order to adapt a service to be provided. For example, preferences for travel destinations, settings of the motor vehicle or accounting data may be stored. This information may be available locally or may be retrieved from the server component 110.

If the mobile device has a communication profile 155 assigned to the user 130 at this time, the method 200 may continue with a step 230, which is described in more detail below. Otherwise, a request to download a communication profile 155 assigned to the user 130 may be provided in a step 215 and transmitted to the server component 110. The request may be received and processed in a step 220 by the server component 110. In one embodiment, based on a reference to the user 130 included in the request, a communication profile 155 stored in the data storage 170 and assigned to the user 130 may be determined and then returned to the motor vehicle 105. In another, preferred embodiment, the communication profile 155 is not stored on the server component 110, but is provided by the server component 118 of the MNO. In a step 221, the server component 110 may make a request to the mobile radio network 115 and/or the server component 118 to obtain the communication profile 155. The request preferably includes an identification of the user 130 and an identification of the mobile device 105.

The server component 118 may provide information on how to download the communication profile 155 in a step 222. This information is also called activation code and generally comprises an identification of the server component 118 and a resource assigned to the communication profile 155. Usually, the activation code is given as a URL.

In one embodiment, the server component 110 may download the communication profile 155 from the server component 118, and in step 225, the communication profile 155 may be received or downloaded by the motor vehicle 105. Together with the communication profile 155, additional information assigned to the user 130 may be downloaded.

In another, preferred embodiment, the activation code may be transmitted to the mobile device 105 in step 225, whereupon the mobile device 105 may download the communication profile 155 directly from the server component 118. Additional information associated with user 130 may be downloaded from the server component 110 as described above.

In a variant of the method 200, the user 130 may be authenticated in a subsequent step 230. This authentication may replace or supplement that of step 210 and is performed based on the information downloaded. For example, the user 130 may provide personal information in step 205, so that in step 230 there is a communication profile 155 of the specified person on the vehicle 105 and/or the device 120. To activate the communication profile 155, additional information may be required, for example a code in the form of a PIN or PUC. If the user 130 may provide this code, he is authenticated, otherwise he may be rejected and the method 200 may end.

In a step 235, the communication profile 155 may be activated using the communication device 135, so that the user may be provided with a communication connection to the mobile radio network 115.

Optionally, before activation in step 235 or already before authentication in step 230, it is determined whether the user 130 is still on the mobile device 105. In the case of the motor vehicle of FIG. 1, the user 130 may also have left the vehicle 105 since the beginning of the method 200. The presence of the user 130 on the vehicle 105 may be determined, for example, by means of an ignition key (or its electronic equivalent, which may in particular be wirelessly connected) inserted into an ignition lock, a vehicle door that has not been opened since the start of the method 200, or an occupancy sensor of a seat in the motor vehicle 105. If the user 130 is no longer in the vehicle 105, the method 200 may be aborted.

The authentication in step 210 and/or in step 230 may also be used to control a use of the motor vehicle 105 by the user 130. If the user 130 is authenticated, he may be authorized for general or personalized use. This means that all or only certain functions of the motor vehicle 105 may be made available to him, in particular driving the motor vehicle 105. A corresponding activation or deactivation of services or functions of the motor vehicle may be carried out in a step 240.

For the purposes of the present invention, it is decisive that the communication profile 155 of the user 130 may be loaded into the memory device 150 so that he may use the device 120 to communicate with the mobile radio network 115. The device 120 configured in this way may behave in this respect like a mobile telephone or similar terminal device assigned to the user 130.

Usually, the communication profile 155 is created by an operator of the mobile radio network 115 or a corresponding service provider and is provided to the user 130. Before the communication profile 115 is provided, it is usually approved by the operator. Parts of communication profile 155 are changeable, others not. For example, a network-wide, unique and unchangeable IMSI may be provided. This may be secured against unauthorized use by means of a PIN and/or a PUC (Personal Unblocking Code).

In addition, contact information for other subscribers may be stored, some of which may be created or changed by the user 130. Other contact information, such as a local emergency number or a node point through which SMS messages may be exchanged, is usually fixed. In addition, a unique serial number (ICCID), security and encryption information, temporary information for access to a local network or a specification of services activated for the user 130 may optionally be stored. The information provided by a communication profile 155 may be designed in accordance with the guidelines of 3GPP, as defined in the specification 11.11, for example.

In order to load the communication profile 155 provided by the network operator to the server component 110, a common process may be used with which the user 130 loads the profile into a mobile telephone, for example. To do this, the user 130 may request the download of the communication profile 115 from mobile radio network 115 and receive an activation code with which he may download the communication profile 155. The user 130 may provide the activation code to the server component 110 so that same may download the communication profile 155 on his behalf and store it in the data storage 170.

It should be understood that the service of the server component 110 may be used by the user 130 by means of a plurality of mobile devices 105. This allows the user 130 to use the same mobile radio profile 155 with several mobile devices 105, even without configuring each of the mobile devices 105 themselves for the mobile radio network 115. In particular, a service of the mobile radio network 115 may be easily transferred from one mobile device 105 to another. The mobile device 105 is preferably configured to contact the server component 110 to obtain the activation code. The mobile device 105 may then supply itself with the communication profile 155 using known GSM technologies and optionally activate the profile immediately.

In an exemplary application, the user 130 may carry a smartphone with him, with which he may use the mobile radio network 115. If the user 130 gets into a motor vehicle 105, as described above, a service of the mobile radio network 115 may continue to be used by the motor vehicle 105. In the vehicle 105, user 130 may put on a mobile radio enabled wristband 105, which may then take over a service of the mobile radio network 115 for the user 130.

For the activation of one of the mobile devices 105, it is not necessary to deposit information specifically referring to a mobile device 105 at the server component 118. Instead, it may be sufficient if the user 130 is registered with the server component 110, where a reference to a communication profile 155 assigned to the user 130 is deposited.

The server component may be set up as a storage service and data created on the mobile device 105, such as images or texts, may be stored remotely by means of the storage service. Such a storage service is also called cloud-based. After the mobile device 105 is activated, user data assigned to the user 130 and stored on the server component 118 may be made available in the mobile device 105. The user data may be downloaded or made accessible on the storage service.

Figure 3:
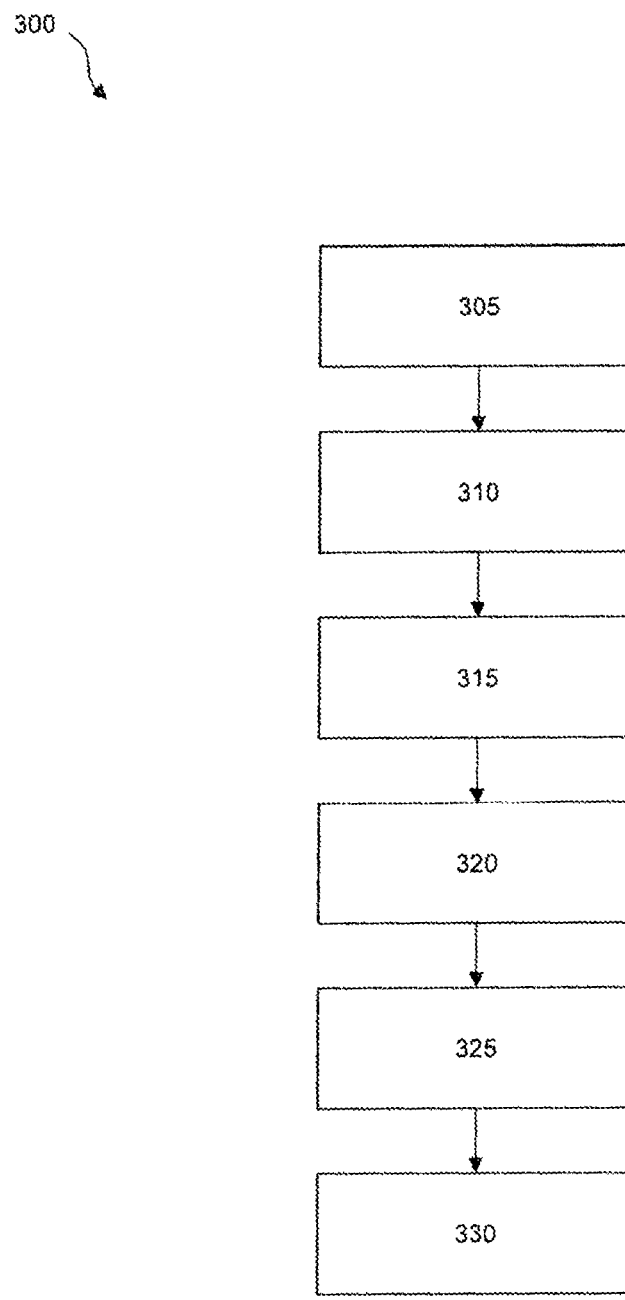
FIG. 3 illustrates a flow chart of a second process.

FIG. 3 illustrates a flow chart of a second method 300. The method 300 may be executed on a system 100 to prepare for the execution of the method 200.

In a step 305, the user 130 may register with the server component 110. Registration may require an existing account, for example with a vehicle rental company. In this case, the user 130 may be forwarded to the server component 110 after logging in to the existing account.

To register, the user 130 may, for example, fill out a web form. Optionally, he may provide an identification of his person to prevent misuse, for example by presenting an identity card or by means of the post-identification method. Here, the user 130 preferably indicates an existing mobile telephone contract, for example in the form of an assigned mobile telephone number.

In a step 310, the server component 110 may send a link request to the server component 118 of the MNO in order to assign a profile assigned locally to the user 130 to a profile that is assigned to the mobile telephone contract by the server component 118. Such a link may also be called an "account federation".

The server component 118 may respond immediately with a step 325 described in more detail below. Preferably it does not to reply immediately, however, but only after an additional check has been carried out. To do this, it may send a query to the user 130 in a step 315 and receive a response from the user 130 in a step 320. Query and response may be exchanged on a mobile device 105 with the user 130, wherein the mobile device 105 may be reached under the specified mobile telephone contract. Alternatively, a personal consultation with user 130 may be made, for which the mobile device 105 does not necessarily have to be used. An offline check is also conceivable, for example by means of a letter to a postal address which is deposited for the user 130 on the server component 118. The user 130 may then reply in any way, for example also by mail, or by telephone, SMS or Internet. With his reply, the user 130 gives permission to link his profiles at the server components 110, 118 and/or to transmit MNO information from the server component 118 to server component 110.

If the user 130 has agreed with his reply, the server component 118 may reply with a message from the server component 110 in a step 325. The message may contain a token that may represent a random or pseudo-random value that may be used by the server component 118 to identify the user 130. If the server component 110 later (see step 221) directs a request to the server component 118, it may transmit the token as well. This allows information of the profile of the user 130 to be hidden from the server component 110 on the side of the server component 118. In particular, the user may use 130 different identities on the server components 110, 118.

In a step 330, the user may qualify the server component 110 to perform the method 200. This qualification may set a parameter associated with the method 200, for example, a number of eSIM profiles that may be used simultaneously. Accordingly, the qualification may be associated with a cost obligation. Different qualifications may be offered on different terms.

As soon as the initializations are completed by the method 300, the method 200 may be executed. It is to be understood that a known process for the distribution and activation of an eSIM profile on a mobile device 105 is split into two parts here represented by the methods 300 and 200. The part of the process 300 is usually carried out only once, in order to allow an automatic run of the process 200 afterwards.

Reference Numerals
100 System
105 Mobile device, preferably vehicle, in particular motor vehicle
110 Server component
115 Mobile radio network
118 Server component
120 Device
125 Scanning device
130 User
135 Communication device (modem)
140 Antenna
145 Processing device
150 Memory device
155 Communication profile
160 Communication device
165 Processing device
170 Data storage
175 Network
200 Method
205 Scan User
210 Authenticate (1)
215 Request profile
220 Provide profile
225 Receive profile
230 Authenticate (2)
235 Provide telecommunications connection
240 Authorize to use the motor vehicle
300 Method
305 User registers with server component
310 Link request
315 Query
320 Response
325 Link token
330 Qualification

The invention claimed is:

1. A method comprising the following steps:
authenticating a user to a vehicle, wherein the vehicle is a mobile device connected to a mobile radio network;
issuing a request from the vehicle to a first external service for the provision of the activation code from the first external service,
wherein the request from the vehicle comprises a reference to an identification of the vehicle;
downloading an activation code from the first external service,
wherein the first external service requests the activation code from a second external service of the mobile radio network associated with the user, wherein the request from the first external service comprises reference to the identification of the vehicle, and
wherein the activation code comprises a URL that references a telecommunications profile for the mobile radio network associated with the user;
downloading the telecommunications profile from the second external service of the mobile radio network to the mobile device on the basis of the activation code;
providing a telecommunications connection between the mobile device and the mobile radio network on the basis of the telecommunications profile.

2. The method according to claim 1 wherein the request includes a reference to an identification of the user.

3. The method according to claim 1, wherein the first external service requests the activation code from the second external service based on information previously received from the mobile device identified in the request.

4. The method according to claim 1, wherein the mobile device detects an input of a code of the user and the telecommunications profile is activated by the code, wherein the telecommunications connection is provided after the activation of the telecommunications profile.

5. The method of claim 4, wherein information in the telecommunications profile associated with the user is decrypted by the input code.

6. The method according to claim 1, wherein downloading the communications profile is carried out via a separate telecommunications connection.

7. A vehicle connected to a mobile radio network, the vehicle comprising:
a scanning device for authenticating a user to the vehicle;
a first communication device configured to:
wirelessly request an activation code from a first external service, wherein the request from the vehicle comprises a reference to an identification of the vehicle, wirelessly download the activation code from the first external service,
wherein the first external service requests the activation code from a second external service of the mobile radio network associated with the user, wherein the request from the first external service comprises the reference to the identification of the vehicle, and
wherein the activation code comprises a URL that references a telecommunications profile for a mobile radio network associated with the user authenticated with the scanning device, and to
download the telecommunications profile from the second external service of the mobile radio network based on the activation code;
a second communication device configured to provide a telecommunications connection between the vehicle and a mobile radio network based on the telecommunications profile.

8. A server component, the server component comprising:
a communication device;
a processing device configured to:
receive a request from a vehicle connected to a mobile radio network via the communication device, wherein the request includes a reference to a user and an identification of the vehicle,
request an activation code from an external service of the mobile radio network associated with the user, wherein the request comprises the reference to the user and the identification of the vehicle,
provide, in response to the request from the vehicle, the activation code comprising a URL referencing a resource of the mobile radio network from which a telecommunications profile for the mobile radio network associated with the user may be downloaded, wherein the telecommunications profile may be used to provide a telecommunications connection between the vehicle and the mobile radio network.

9. The server component of claim 8,
wherein the request received by the processing device via the communication device further includes a reference to an identification of the mobile device, and
wherein the processing device is further configured to request the activation code from the resource of the mobile radio network based on information previously received from the mobile device identified in the request.

10. A system comprising the server component of claim 8 and a vehicle operating as the mobile device, the vehicle comprising:

a scanning device for authenticating the user to the vehicle;
a first communication device configured to:
provide the request for the activation code to the server component, wherein the request comprises the reference to the user authenticated with the scanning device,
download the activation code from the server component, and to
download the telecommunications profile from the resource of the mobile radio network based on the activation code; and
a second communication device configured to provide the telecommunications connection between the vehicle and the mobile radio network based on the telecommunications profile.

\* \* \* \* \*